(12) United States Patent
Yamazoe

(10) Patent No.: US 7,414,754 B2
(45) Date of Patent: Aug. 19, 2008

(54) COLOR CONVERSION MATRIX FORMING METHOD, COLOR CONVERSION TABLE FORMING METHOD, AND PROGRAM

(75) Inventor: Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 10/938,603

(22) Filed: Sep. 13, 2004

(65) Prior Publication Data
US 2005/0073707 A1 Apr. 7, 2005

(30) Foreign Application Priority Data
Oct. 1, 2003 (JP) ............... 2003-342963

(51) Int. Cl.
*G06K 15/00* (2006.01)
*G06F 13/00* (2006.01)
(52) U.S. Cl. ...................................... 358/1.9
(58) Field of Classification Search ................. 358/1.8, 358/1.9, 1.16, 523, 535; 382/162, 167, 300; 380/202
See application file for complete search history.

(56) References Cited

U.S. PATENT DOCUMENTS

| | | | | |
|---|---|---|---|---|
| 5,719,956 A | * | 2/1998 | Ogatsu et al. ............... | 385/167 |
| 5,987,167 A | * | 11/1999 | Inoue ........................ | 382/167 |
| 6,335,800 B1 | * | 1/2002 | Balasubramanian ........ | 358/1.9 |
| 6,415,065 B1 | * | 7/2002 | Miyake ...................... | 382/300 |
| 6,822,757 B1 | * | 11/2004 | Usami et al. ............... | 358/1.9 |
| 2003/0038954 A1 | * | 2/2003 | Odagiri et al. ............. | 358/1.9 |
| 2007/0115503 A1 | * | 5/2007 | Nakami et al. ............. | 358/1.16 |

FOREIGN PATENT DOCUMENTS

| | | |
|---|---|---|
| EP | 0 969 413 | 1/2000 |
| GB | 1 595 122 | 8/1981 |
| JP | 53-123201 | 10/1978 |
| JP | 2000-22973 | 1/2000 |

* cited by examiner

*Primary Examiner*—Twyler L. Haskins
*Assistant Examiner*—Dennis Dicker
(74) *Attorney, Agent, or Firm*—Fitzpatrick, Cella, Harper & Scinto

(57) ABSTRACT

A method of easily obtaining a color conversion matrix serving as a foundation of color reproduction at a high speed irrespective of its degree is provided. The method has: a step of constructing nth-degree matrix coefficients regarding a first color space of a plurality of color patch data sets and obtaining a pseudo inverse matrix to the obtained matrix; and a step of forming a color conversion matrix from a product of a matrix constructed by color data regarding a second color space of the color patch data sets and the pseudo inverse matrix.

7 Claims, 2 Drawing Sheets

COLOR CONVERSION MATRIX FORMING METHOD, COLOR CONVERSION TABLE FORMING METHOD, AND PROGRAM

BACKGROUND OF THE INVENTION

1. Field of the Invention

The invention relates to a color processing technique of digital color image data and, more particularly, to a color conversion matrix forming method and a color conversion table forming method for executing the same color reproduction as that of an original by a scanner, a color printer, a color monitor, or the like.

2. Related Background Art

In recent years, in association with the spread of personal computers, input devices such as scanner, digital still camera, and the like and output devices such as an ink jet printer and the like have remarkably been progressed.

In addition, those products have been widespread in the market as consumer apparatuses of high performance but a low price and are ordinarily used more and more in general homes.

Hitherto, there is such a problem that when a color document or image is printed or copied, a result which is obtained is not always satisfactory with respect to the color reproduction in dependence on the apparatus. As a cause for such a problem, there is a large difference in principle between the colors because the colors which are handled in a computer are generated on the basis of additive color mixture of RGB color data, while the colors which are handled upon printing are generated by subtractive color mixture.

To absorb such a difference in principle, there is an idea of a color profile. That is, a color converting process is executed by providing a PCS color space (Profile Connection Space) (hereinbelow, referred to as PCS) between an input and an output. Specifically speaking, the input has an input profile for converting an input device color into the PCS and the output has a color profile for converting the PCS into an output device color, thereby managing characteristics of each apparatus as a profile. Such a color profile has already been established as an ICC profile and is a concept which has already been spread.

The profile is a matrix or a 3-dimensional lookup table (hereinbelow, referred to as 3D-LUT). If the characteristics cannot be described by a matrix of 3 rows and 3 columns, an image process is executed on the basis of the 3D-LUT. Details and operation regarding the color converting process by the 3D-LUT have been disclosed in Japanese Patent Application Laid-open No. S53-123201, Japanese Patent Application Laid-open No. 2000-022973, and the like. According to the tetrahedron interpolation disclosed in the above Official Gazettes, a linear interpolation arithmetic operation is executed by using data of four lattice points in the interpolation arithmetic operation.

Since such a profile describes the characteristics peculiar to the device, it is inherently ideal to form a profile peculiar to the apparatus. With respect to each of the input and output devices, particularly, in the consumer apparatuses, there is contradiction in a certain sense of compatibility of low costs and high quality. However, it is difficult to form completely the same products, a slight individual difference exists certainly, and an aging change also exists.

However, since a processing load that is required to form the profile is generally large, the profile formed by the standard apparatus is actually used. If the profile can be easily formed at a high speed every apparatus owing to the reduction in processing load, a color drift due to the individual difference or the aging change can be eliminated.

Creation of the profile will now be described with respect to the input device as an example. If the correspondence between RAWRGB as an input device color and XYZ of the PCS (Profile Connection Space) has a linearity, the relation shown by the following equation (1) is satisfied.

$$\begin{pmatrix} X \\ Y \\ Z \end{pmatrix} = \begin{pmatrix} m11 & m12 & m13 \\ m21 & m22 & m23 \\ m31 & m32 & m33 \end{pmatrix} \begin{pmatrix} R \\ G \\ B \end{pmatrix} \quad (1)$$

At this time, if there are nine independent color patch data sets, a color conversion matrix which satisfies the equation (1) can be unconditionally determined.

Actually, it is difficult to have the perfect linearity between the device color and the PCS color. Since this means that the sensor characteristics of each color of RGB have to be completely linear, it is not practical. Therefore, a higher-degree matrix is formed in order to consider nonlinear elements. An example of a quadratic color conversion matrix is shown below.

$$\begin{pmatrix} X \\ Y \\ Z \end{pmatrix} = \begin{pmatrix} & M_{ij} & \end{pmatrix} \begin{pmatrix} R \\ G \\ B \\ R^2 \\ G^2 \\ B^2 \\ RG \\ GB \\ BR \\ C \end{pmatrix} \quad (i=1\ldots10, j=1\ldots3) \quad (2)$$

where, $M_{ij}$: quadratic matrix coefficients

C: constant term which is used as necessary

When considering the case where the color conversion matrix is generalized to the nth-degree and the color conversion matrix is formed, if its solutions are the color patch data sets of the same number as the number (unknown) of matrix coefficients, the color conversion matrix can be unconditionally determined. However, actually, in order to adapt to the whole region of the color space, a larger number of data sets have to be used as color patch data sets. Therefore, hitherto, the optimal solutions have been found by a method of obtaining the solutions of nonlinear simultaneous equations represented by the method of least squares.

Although the methods such as a method of least squares and the like have already been established, a complicated arithmetic operation such as a partial differentiation or the like is needed in a calculating step. Further, the higher the degree of the matrix is, the more the arithmetic operation becomes remarkably complicated.

SUMMARY OF THE INVENTION

The invention is made in consideration of the above problems and it is an object of the invention to provide a method of easily obtaining a color conversion matrix serving as a foundation of color reproduction at a high speed irrespective of its degree.

To solve the above problems, according to the invention, there is provided a method comprising the steps of: constructing nth-degree matrix coefficients regarding a first color space of a plurality of color patch data sets and obtaining a pseudo inverse matrix for the obtained matrix; and forming a color conversion matrix from a product of a matrix constructed by color data regarding a second color space of the color patch data sets and the pseudo inverse matrix.

A matrix operation has already been established as a linear algebra and an arithmetic operating algorithm according to a computer also already exists.

DETAILED DESCRIPTION OF THE PREFERRED EMBODIMENTS

Embodiments of the invention will now be described in detail hereinbelow with reference to the drawings.

Embodiment 1

Figure 1:
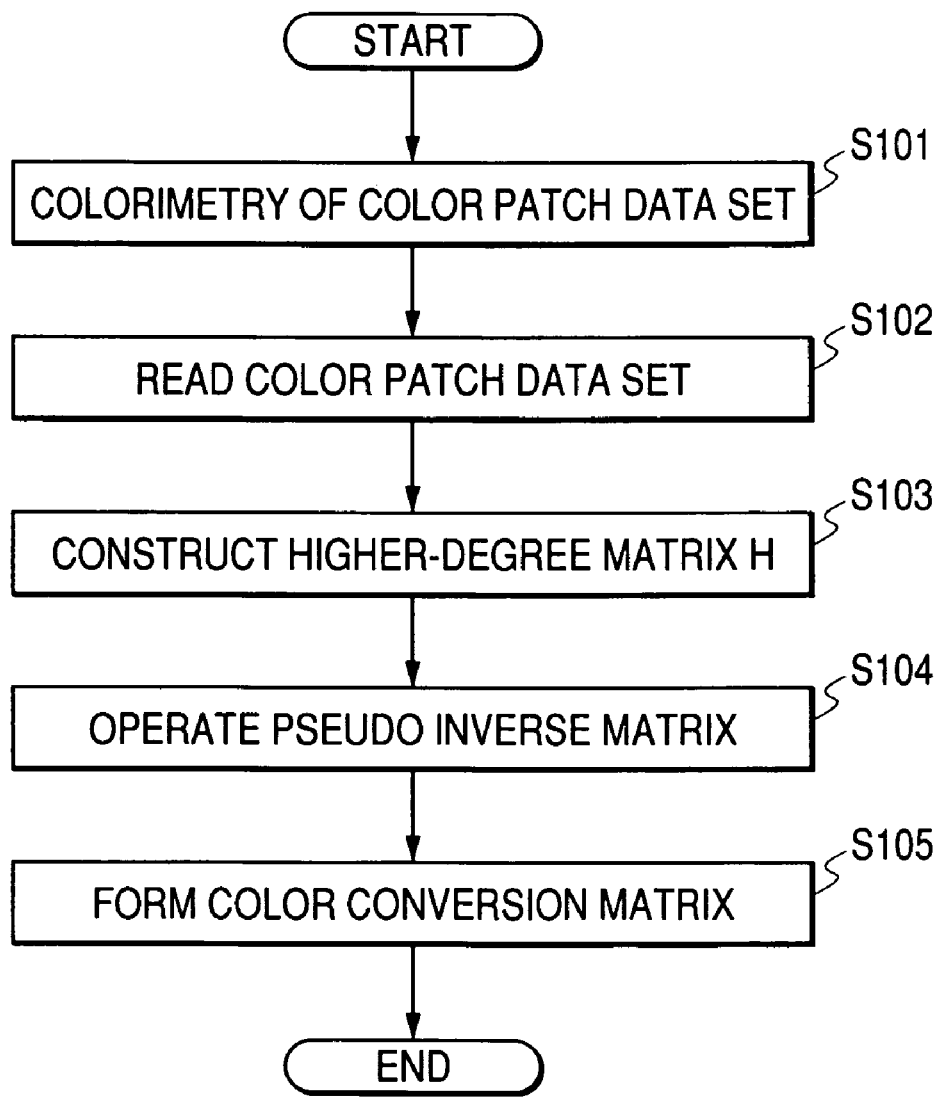
FIG. 1 is a flowchart showing a processing procedure of the invention.

FIG. 1 is a flowchart at the time of forming a color conversion matrix according to the invention. First, in step S101, colorimetry of a plurality of color patch data sets is performed. It is desirable to perform the colorimetry by CIEXYZ values which are made to correspond by a matrix. In next step S102, the color patch data sets are fetched by a desired input device. As an input device, for example, a flatbed scanner or a digital still camera can be used. At this time, data of a device color of the input device, that is, RAW data is obtained. Subsequently, in step S103, a higher-degree matrix H of a desired degree is formed. Each row of the matrix H is constructed by a higher-degree term of the input device color RAWRGB. In the case of using up to quadratic terms, the matrix H becomes as follows.

$$H = \begin{pmatrix} R_1 & G_1 & B_1 & R_1^2 & G_1^2 & B_1^2 & RG_1 & GB_1 & BR_1 & C_1 \\ R_2 & G_2 & B_2 & R_2^2 & G_2^2 & B_2^2 & RG_2 & GB_2 & BR_2 & C_2 \\ R_3 & G_3 & B_3 & R_3^2 & G_3^2 & B_3^2 & RG_3 & GB_3 & BR_3 & C_3 \\ & & & & & \vdots & & & & \\ R_n & G_n & R_n & R_n^2 & G_n^2 & B_n^2 & RG_n & GB_n & BR_n & C_n \end{pmatrix} \quad (3)$$

where,

C: constant term which is added as necessary subscript n: coefficient constructed by the RAW data of the nth color patch data Further, when the user intends to attach importance to specific color patch data, it is sufficient to simply increase the number of rows corresponding to such data by a weight. For example, if the color patch data of white is weighted by 10 more than other color patches, it is proper to set the number of rows of the white color patch data to 10. In this case, the number of rows of the matrix H is equal to (n+9). The specific color patch data is not limited to white but it is possible to extremely easily weight the data of the color patch to which the user particularly intends to attach importance.

In step S104, a pseudo inverse matrix of the matrix H is constructed. In this case, since the number of color patch data sets is large as compared with the number of elements (unknown) of the color conversion matrix, a left-side pseudo inverse matrix is used. A left-side pseudo inverse matrix $H^{LM}$ can be obtained by the following equation (4).

$$H^{LM} = (H^T H)^{-1} H^T \quad (4)$$

where, superscript T: transposed matrix power (−1): inverse matrix

Lastly, in step S105, the color conversion matrix is formed in accordance with the following equation (5).

$$M_{ij} = H^{LM} \begin{pmatrix} X_1 & Y_1 & Z_1 \\ X_2 & Y_2 & Z_2 \\ X_3 & Y_3 & Z_3 \\ & \vdots & \\ X_n & Y_n & Z_n \end{pmatrix} \quad (5)$$

where, $M_{ij}$: components of the color conversion matrix

As mentioned above, according to the embodiment, the color conversion matrix can be easily formed at a high speed irrespective of the degree by using the characteristics of the pseudo inverse matrix.

Embodiment 2

The embodiment 1 has been described above with respect to the forming method of the color conversion matrix. Creation of the 3D-LUT to which such a method is applied will now be described. As for a 3D-LUT, the color space of the input is previously divided and mapping points regarding a representative point (hereinafter, referred to as a grid) are previously obtained and held as a table. For example, if the RAWRGB data of the input device is normalized by 1 and each channel is uniformly divided into 16 portions, the total of 4913 grids are obtained.

Figure 2:
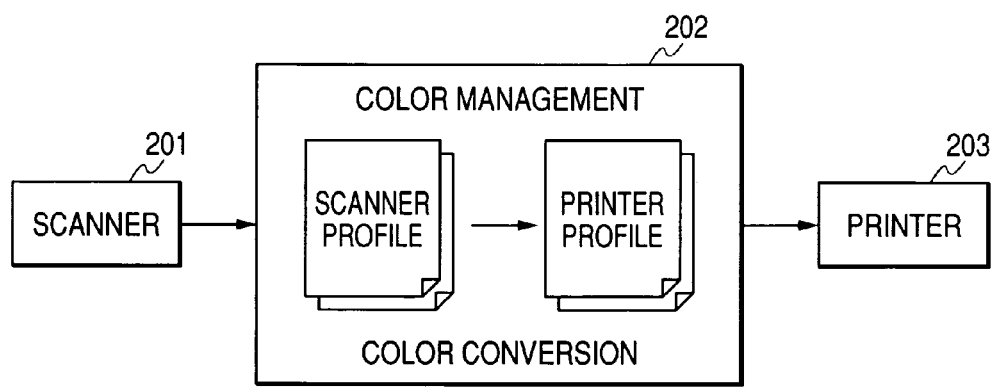
FIG. 2 is a diagram showing a color management system using a color profile.

In a system as shown in FIG. 2, the color conversion matrix is formed by the method described in the embodiment 1 in order to previously form a profile showing device characteristics of a scanner 201. Now, assuming that a quadratic color conversion matrix is constructed, XYZ values are obtained by applying the equation (2) to the RGB values of each grid. In the case of the format of the ICC profile, the XYZ are used as they are or the 3D-LUT can be also constructed after they are converted into CIELAB.

Figure 3:
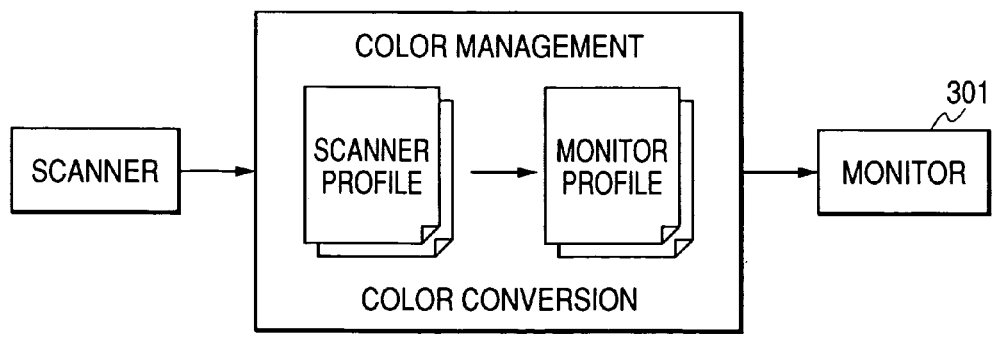
FIG. 3 is a diagram showing a color management system using a monitor profile.

If the color profile of the input device is constructed as mentioned above, an image processing system according to color management 202 is realized by RAWRGB of the scanner 201 and its profile and, further, by a printer 203 and its profile. If the output device is a monitor, the color can be reconstructed by executing the color management by a monitor profile as shown in FIG. 3.

In the embodiment 2, although the color management system using the ICC profile has been mentioned as an example of the 3D-LUT system, in an apparatus which directly copies an image like a multifunction printer (MFP) (apparatus in which the scanner and the printer are directly connected), it is sufficient to preliminarily combine the input/output profiles into one profile. That is, the color conversion matrix can be also obtained as a matrix which corresponds not to the PCS but to the output device color (for example, CMY).

Although the details mainly regarding the creation of the color conversion matrix of the input device have been described above as embodiments, since its essence is in the correspondence from the first color space to the second color space, naturally, the invention is not limited to it. That is, the above method can be used when obtaining the color conversion matrix for converting the CIEXYZ data into the device color data of the output device.

Other Embodiments

The invention also incorporates the case where program codes of software for realizing the functions of the embodiments mentioned above are supplied to a computer in an apparatus or a system connected to the various devices so that those devices are made operative so as to realize the functions of the embodiments mentioned above, and the computer (or a CPU or an MPU) of the system or apparatus makes the various devices operative in accordance with a stored program, thereby realizing those functions.

In this case, the program codes themselves of the software realize the functions of the embodiments mentioned above and the program codes themselves and means for supplying the program codes to the computer, for example, a storing medium in which the program codes have been stored construct the invention.

As such a storing medium for storing the program codes, for example, a floppy (registered trademark) disk, a hard disk, an optical disk, a magnetooptic disk, a CD-ROM, a magnetic tape, a non-volatile memory card, a ROM, or the like can be used.

Naturally, those program codes are also incorporated in the embodiments of the invention not only in the case where the computer executes the supplied program codes, so that the functions of the embodiments mentioned above are realized but also in the case where those program codes cooperate with the OS (Operating System) which is operating in the computer, another application software, or the like and the functions of the embodiments mentioned above are realized.

Further, naturally, the invention also incorporates the case where the supplied program codes are stored into a memory provided for a function expanding board of a computer or a function expanding unit connected to the computer, thereafter, a CPU or the like provided for the function expanding board or the function expanding unit executes a part or all of actual processes on the basis of instructions of the program codes, and the functions of the embodiments mentioned above are realized by those processes.

As described above, in the creation of the color conversion matrix for allowing the first color space to correspond to the second color space, by using the pseudo inverse matrix when optimizing by the higher-degree matrix in order to include the nonlinear elements, the higher-degree color conversion matrix can be fairly simply calculated at a high speed irrespective of the degree of the color conversion matrix.

This application claims priority from Japanese Patent Application No. 2003-342963 filed Oct. 1, 2003, which is hereby incorporated by reference herein.

What is claimed is:

1. A method of calculating a color conversion matrix for allowing color data in a first color space regarding a plurality of color patch data to correspond to color data in a second color space, comprising the steps of:

forming a pseudo inverse matrix of a matrix constructed by the color data in said first color space when the number of said color patch data does not coincide with the total number of components of said color conversion matrix; and calculating said color conversion matrix by using said pseudo inverse matrix and a matrix constructed by the color data in said second color space, wherein in the matrix constructed by the color data in said first color space, the number of row components of the matrix regarding color patch data to which importance should be attached in said first color space is increased to a value larger than the number of row components of the matrix regarding the other color patch data in said first color space.

2. A method according to claim 1, wherein the color data in said first color space is device color data of an input device and the color data in said second color space is CIEXYZ data.

3. A method according to claim 1, wherein the color data in said first color space is CIEXYZ data and the color data in said second color space is device color data of an output device.

4. A method according to claim 1, wherein the matrix constructed by the color data in said first color space includes a higher-degree term of the color data in said first color space.

5. A method of forming a color conversion table of a color profile for defining a device color from an optimum color conversion matrix for allowing color data in a first color space regarding a plurality of color patch data to correspond to color data in a second color space, comprising the steps of:

forming a pseudo inverse matrix of a matrix constructed by the color data in said first color space when the number of said color patch data does not coincide with the total number of components of said color conversion matrix;

calculating said color conversion matrix by using said formed pseudo inverse matrix and a matrix constructed by the color data in said second color space;

wherein in the matrix constructed by the color data in said first color space, the number of row components of the matrix regarding color patch data to which importance should be attached in said first color space is increased to a value larger than the number of row components of the matrix regarding the other color patch data in said first color space; and forming said color conversion table by using said color conversion matrix.

6. A computer program, stored on a computer readable medium, for obtaining a color conversion matrix for allowing color data in a first color space regarding a plurality of color patch data to correspond to color data in a second color space, comprising:

a code for forming a pseudo inverse matrix of a matrix constructed by the color data in said first color space when the number of said color patch data does not coincide with the total number of components of said color conversion matrix; and a code for calculating said color conversion matrix by using said formed pseudo inverse matrix and a matrix constructed by the color data in said second color space, wherein in the matrix constructed by the color data in said first color space, the number of row components of the matrix regarding color patch data to which importance should be attached in said first color space is increased to a value larger than the number of row components of the matrix regarding the other color patch data in said first color space.

7. A method according to claim 1, wherein the color patch data to which importance should be attached is white color patch data.

* * * * *